(12) United States Patent
Swaddle et al.

(10) Patent No.: US 9,693,548 B2
(45) Date of Patent: Jul. 4, 2017

(54) SYSTEM AND METHOD FOR DISRUPTING AUDITORY COMMUNICATIONS AMONG ANIMALS IN A DEFINED LOCALE

(71) Applicant: College of William and Mary, Williamsburg, VA (US)

(72) Inventors: John P Swaddle, Williamsburg, VA (US); Mark K Hinders, Williamsburg, VA (US)

(73) Assignee: COLLEGE OF WILLIAM AND MARY, Williamsburg, VA (US)

( * ) Notice: Subject to any disclaimer, the term of this patent is extended or adjusted under 35 U.S.C. 154(b) by 253 days.

(21) Appl. No.: 14/290,150

(22) Filed: May 29, 2014

(65) Prior Publication Data

US 2014/0352631 A1    Dec. 4, 2014

Related U.S. Application Data

(60) Provisional application No. 61/830,085, filed on Jun. 1, 2013.

(51) Int. Cl.
*A01M 29/00* (2011.01)
*A01M 29/18* (2011.01)

(52) U.S. Cl.
CPC .................... *A01M 29/18* (2013.01)

(58) Field of Classification Search
CPC .............................. A01M 29/16; A01M 29/18
USPC .......................................................... 119/719
See application file for complete search history.

(56) References Cited

U.S. PATENT DOCUMENTS

| | | | | |
|---|---|---|---|---|
| 2,922,999 A * | 1/1960 | Benson | ................. | A01M 29/18 116/137 A |
| 4,658,386 A * | 4/1987 | Morris | ................. | A01M 29/18 340/565 |
| 5,463,595 A * | 10/1995 | Rodhall | ................. | A01M 29/18 340/426.23 |
| 5,570,322 A * | 10/1996 | Miller | ................. | A01M 29/16 367/107 |
| 5,598,379 A * | 1/1997 | Malleolo | ................. | A01M 29/18 340/384.2 |
| 5,602,523 A * | 2/1997 | Turchioe | ................. | A01K 15/02 116/22 A |
| 6,570,494 B1 * | 5/2003 | Leftridge, Sr. | ........ | A01M 29/18 116/22 A |
| 6,837,001 B2 * | 1/2005 | Amburgey | ............ | A01M 1/026 367/139 |

(Continued)

FOREIGN PATENT DOCUMENTS

| CH | CA 2812851 A1 * | 4/2012 | ............ | A01M 29/16 |
|---|---|---|---|---|
| FR | 2701193 A1 * | 8/1994 | ............ | A01M 29/10 |

(Continued)

*Primary Examiner* — Monica Williams
*Assistant Examiner* — Aaron Rodziwicz
(74) *Attorney, Agent, or Firm* — Peter J. Van Bergen (57) ABSTRACT

One or more sound producers disrupt auditory communications among animals in a defined locale. The sound is defined by (i) a frequency range commensurate with a communication frequency range used by at least one species to carry out auditory communications, (ii) colored noise in the frequency range, and (iii) a sound level of the colored noise in the frequency range at a perimeter region of the defined locale not to exceed approximately a peak sound level associated with auditory communications of one or more species.

18 Claims, 11 Drawing Sheets

(56) References Cited

U.S. PATENT DOCUMENTS

| | | | | |
|---|---|---|---|---|
| 7,707,767 B2 * | 5/2010 | Ragon | ............... | A01M 1/02 367/139 |
| 2003/0058740 A1 * | 3/2003 | Jincks | ............... | A01M 29/16 367/139 |
| 2003/0091200 A1 * | 5/2003 | Pompei | ............... | B06B 1/0292 381/77 |
| 2003/0102964 A1 * | 6/2003 | Hagstrum | ............... | A01K 15/02 340/384.2 |
| 2007/0242566 A1 * | 10/2007 | Hsu | ............... | A01M 1/026 367/139 |
| 2008/0084787 A1 * | 4/2008 | Graber | ............... | A01M 29/16 367/96 |
| 2008/0146287 A1 * | 6/2008 | Zhu | ............... | A01M 29/18 455/566 |
| 2012/0286942 A1 * | 11/2012 | Wu | ............... | A01M 29/18 340/384.2 |
| 2013/0118397 A1 * | 5/2013 | Lin | ............... | A01M 29/16 116/22 A |
| 2013/0249218 A1 * | 9/2013 | Vassilev | ............... | A01M 29/16 290/55 |
| 2014/0144390 A1 * | 5/2014 | Duncan | ............... | A01M 31/002 119/713 |
| 2014/0148978 A1 * | 5/2014 | Duncan | ............... | A01M 29/10 701/3 |
| 2014/0247696 A1 * | 9/2014 | Lee | ............... | A01M 29/16 367/139 |
| 2014/0261151 A1 * | 9/2014 | Ronning | ............... | A01M 29/10 116/22 A |

FOREIGN PATENT DOCUMENTS

| | | | | |
|---|---|---|---|---|
| JP | EP 1157610 A1 * | 11/2001 | ............ | A01M 29/18 |
| JP | EP 1157611 A1 * | 11/2001 | ............ | A01M 29/18 |
| WO | WO 2004010762 A2 * | 2/2004 | ............ | A01M 1/023 |

* cited by examiner

SYSTEM AND METHOD FOR DISRUPTING AUDITORY COMMUNICATIONS AMONG ANIMALS IN A DEFINED LOCALE

Pursuant to 35 U.S.C. §119, the benefit of priority from provisional application 61/830,085, with a filing date of Jun. 1, 2013, is claimed for this non-provisional application.

FIELD OF THE INVENTION

The invention relates generally to auditory communications among animals, and more particularly to a system and method for benignly disrupting auditory communications among animals in a defined locale with minimal impact to animals or people outside the defined locale.

BACKGROUND OF THE INVENTION

The presence of a variety of animals in various locales can significantly and negatively impact economic, social, or conservation resources. For example, the presence of various bird species in certain locales can negatively impact agriculture, manmade structures, and the aviation industry. The annual economic costs due to the damage caused by birds are estimated at $1.9 billion in the United States alone. Millions in agricultural losses are caused just by European starlings making them the most destructive invasive pest bird in the United States.

Numerous technologies have been developed that attempt to deter birds from roosting in agricultural fields. Such technologies include species-specific alarm calls, predator calls, live predators (e.g., falconers, dogs), or particularly loud noises (e.g., propane exploders) that greatly disturb surrounding communities. The prior art technologies used to deter birds from sensitive areas have generally failed since birds quickly habituate to the scare regimes which make these devices neither effective nor sustainable for a long term application. Scare tactics such as alarm calls have been shown to have reduced effectiveness within a few weeks of application. Making long-term physical habitat changes to manage bird exclusion is not a preferred method of action due to the environmental impact associated therewith. Direct control, such as trapping and euthanizing large numbers of birds to protect industrial structures, has been proven to have minimal impact on the overall bird population in the vicinity of the risk area.

Aircraft collisions with birds cause a serious economic and safety problem. On a worldwide basis, direct and indirect costs to the civil aviation industry owing to bird strikes exceed $1.2 billion annually. In 2011, of the 10,083 wildlife strikes that were reported in the United States, 97.1 percent thereof involved birds. The annual cost of these strikes was estimated to be $718 million in direct and indirect losses. To make matters worse, airport locales frequently attract some bird species because of the presence of resources such as food and nesting sites.

Animals are also adversely impacted and suffer from stress and increased mortality around areas of human habitation, buildings, agriculture and infrastructure. For example, in the United States alone, approximately one billion birds are killed each year by flying into buildings, cell towers, wind turbines, and other man-made structures. Some animals are intentionally killed by humans because of encroachment into areas of human habitation and agriculture.

SUMMARY OF THE INVENTION

Accordingly, it is an object of the present invention to provide a method and system for reducing the presence of one or more animal species in defined locales.

Another object of the present invention is to provide a method and system that benignly deters the presence and alters the behavior of one or more bird species in defined locales.

Still another object of the present invention is to provide a method and system for reducing species presence in a defined locale in a benign fashion while minimizing impact on other animals and humans outside of the defined locale.

A further object of the present invention is to provide a method and system for reducing species stress and mortality in a defined locale in a benign fashion by deterring the presence of a targeted species or groups of species near human habitation, buildings, towers, wind turbines, agriculture, aquaculture, and infrastructure.

Other objects and advantages of the present invention will become more obvious hereinafter in the specification and drawings.

In accordance with the present invention, a method and system are provided for disrupting auditory communications among animals in a defined locale. One or more sound producers introduce sound into a defined locale. The sound is defined by (i) a frequency range commensurate with a communication frequency range used by at least one species to carry out auditory communications, (ii) colored noise in the frequency range, and (iii) a sound level of the colored noise in the frequency range at a perimeter region of the defined locale not to exceed approximately a peak sound level associated with auditory communications of the at least one species.

The introduced sound makes auditory communications within one species or among more than one species unintelligible in the defined locale.

BRIEF DESCRIPTION OF THE DRAWINGS

Other objects, features, and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
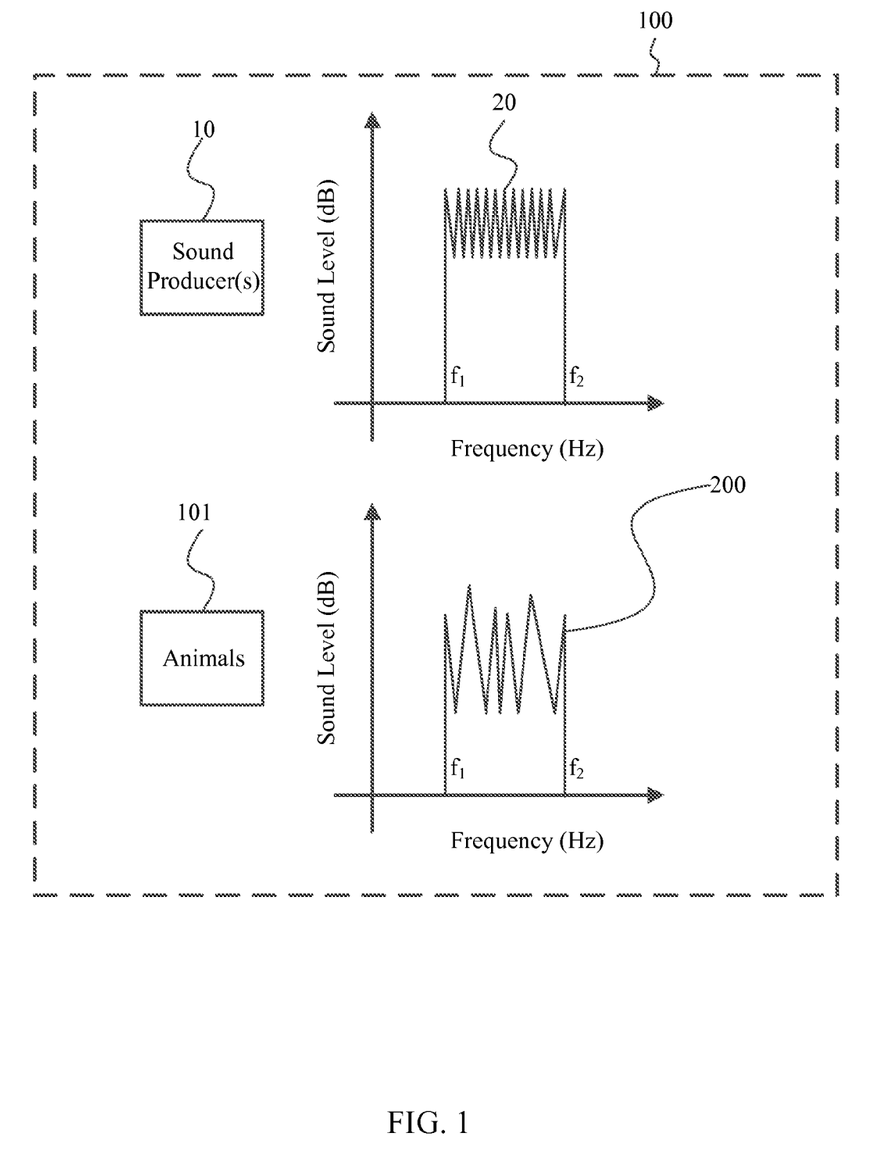
FIG. 1 is a schematic view of a system for disrupting auditory communications among animals in accordance with an embodiment of the present invention.

Referring now to the drawings and more particularly to FIG. 1, system 10 is provided for disrupting auditory communications within one species or among more than one species of animals in a defined locale in accordance with the present invention. It has been found that when animals cannot communicate effectively in their usual auditory manner, animals tend to move to a location where such auditory communication is possible. Accordingly, system 10 provides the means to greatly reduce or clear a define locale of one or more animal species by disrupting auditory communications in the define locale.

Defined locale 100 is any region on the ground, in the air, on the ground and in the air, in the water, etc. For example, defined locale 100 could be an agricultural field, air space in advance of a vehicle, ground regions and associated air space (e.g., an airport's runway, a building, a cell tower, etc.), and areas around fishing, aquaculture and submerged nets. It will be assumed that one or more species of animals visit or live in defined locale 100, and that these animals communicate with one another in an auditory fashion. For simplicity of the following description, it will be assumed that only one species of animals 101 reside in defined locale 100 and that animals 101 carry out auditory communications using a frequency-modulated waveform of which waveform 200 is just one illustrative example. However, it is to be understood that the present invention can be readily extended to simultaneously reduce the presence of multiple animal species in defined locale 100. It is also to be understood that waveform 200 is used for purpose of description only and the specifics thereof are not limitations of the present invention. In general, auditory communications waveform 200 is bounded by lower and upper frequencies $f_1$ and $f_2$, respectively. The sound level of waveform 200 will typically fluctuate between frequencies $f_1$ and $f_2$ such that a peak sound level will be defined in the $f_1$-to-$f_2$ frequency range.

System 10 is one or more sound producers capable of introducing sound into defined locale 100 that will disrupt auditory communications carried out in accordance with waveform 200. The sound introduced by system 10 is indicated by waveform 20. The sound can be introduced using directional and/or nondirectional sources without departing from the scope of the present invention. Similar to waveform 200, it is to be understood that waveform 20 is used for purpose of description only and that the specifics thereof are not limitations of the present invention. However, the sound defined by waveform 20 does possess some general attributes predicated on the specifics of auditory communications waveform 200. These general attributes apply to all types of specific auditory communications waveforms. In general, the sound defined by waveform 20 should (i) have a frequency range corresponding or matched to the frequency range of auditory communications waveform 200, (ii) be colored noise (e.g., pink noise, gray noise, etc.) in the corresponding frequency range, and (iii) have a sound level that does not exceed approximately the peak sound level associated with auditory communications waveform 200. By introducing waveform 20 with these three attributes into defined locale 100, the auditory communications carried out using waveform 200 are disrupted. That is, the sound associated with waveform 20 overlays the sound associated with waveform 200 in such a way that the details of waveform 200 became unintelligible to the particular animal species. As a result, the animal species will tend to leave defined locale 100 in favor of another location where the details of waveform 200 are again discernible. The present invention achieves this result at a sound level that does not exceed the peak sound level of the animal's auditory communications waveform 200. Accordingly, in stark contrast to loud startle impulse noise sources such as canons, the sound associated with waveform 20 will have little or no impact on human communities and non-targeted species surrounding defined locale 100.

The system and method of the present invention can be realized in a variety of ways and for a variety of applications without departing from the scope of the present invention. Several non-limiting examples of systems and applications will be described below.

Figure 2:
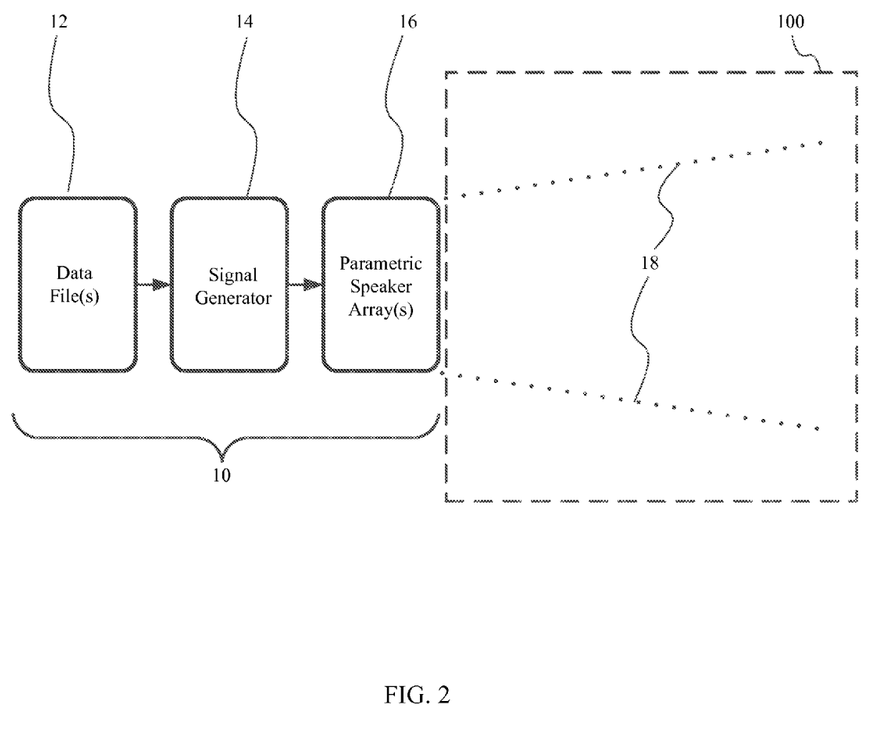
FIG. 2 is a schematic view of a system for disrupting auditory communications in accordance with another embodiment of the present invention.

Referring now to FIG. 2, system 10 can include one or more data files 12, a signal generator 14, and one or more parametric speaker arrays 16. Data file 12 is analog or digital data that is indicative of one or more waveforms that are a function of frequency. Data file 12 can be provided on a variety of fixed or portable media (e.g., hard drive, solid-state memory, flash drive, CD, etc.), could be transmitted from a remote location (e.g., via hardwire or wireless communication), or otherwise made available without departing from the scope of the present invention. Signal generator 14 is any device capable of processing data file 12 to output one or more data-indicative waveforms to the one or more parametric speaker arrays 16.

As is known in the art, parametric speaker arrays are devices that combine two ultrasonic outputs to produce highly-directed and constrained beams of sound such that the sound is not audible outside the beam's extent. Briefly, parametric speaker arrays work by emitting ultrasound waves that transition to lower frequencies because of nonlinear and absorption effects as the waves propagate. The nonlinear effects provide for the creation of a narrow sound beam whose acoustic energy can be delivered over large distances without being heard outside of the beam. Parametric speaker arrays have a broad frequency band that allows the initially-introduced waveform to contain a range of frequencies. In carrying out the method of the present invention, the two ultrasonic outputs can be emitted from the same device or two separate devices without departing from the scope of the present invention.

On a more detailed level, a parametric speaker array is a large transducer or an array of transducers that simultaneously emit two high-power high-frequency ultrasound waves. The superposition of two frequencies causes the waveform to be amplitude modulated at the difference of the two original frequencies. As the waves propagate away from the parametric speaker array, they begin to transform because of the nonlinearity of the air. When two high-powered ultrasonic beams are present, a nonlinear phenomenon called demodulation occurs. This creates sum and difference frequency components at the sum and difference frequencies of the two original frequencies. The difference frequency will stay confined to the narrow beam creating a highly-directional, low-frequency beam. In FIG. 2, and in terms of the present invention, the low-frequency beam (defined by the region between dotted lines 18) introduced into defined locale 100 contains the sound having the attributes of waveform 20 describe above.

Figure 3:
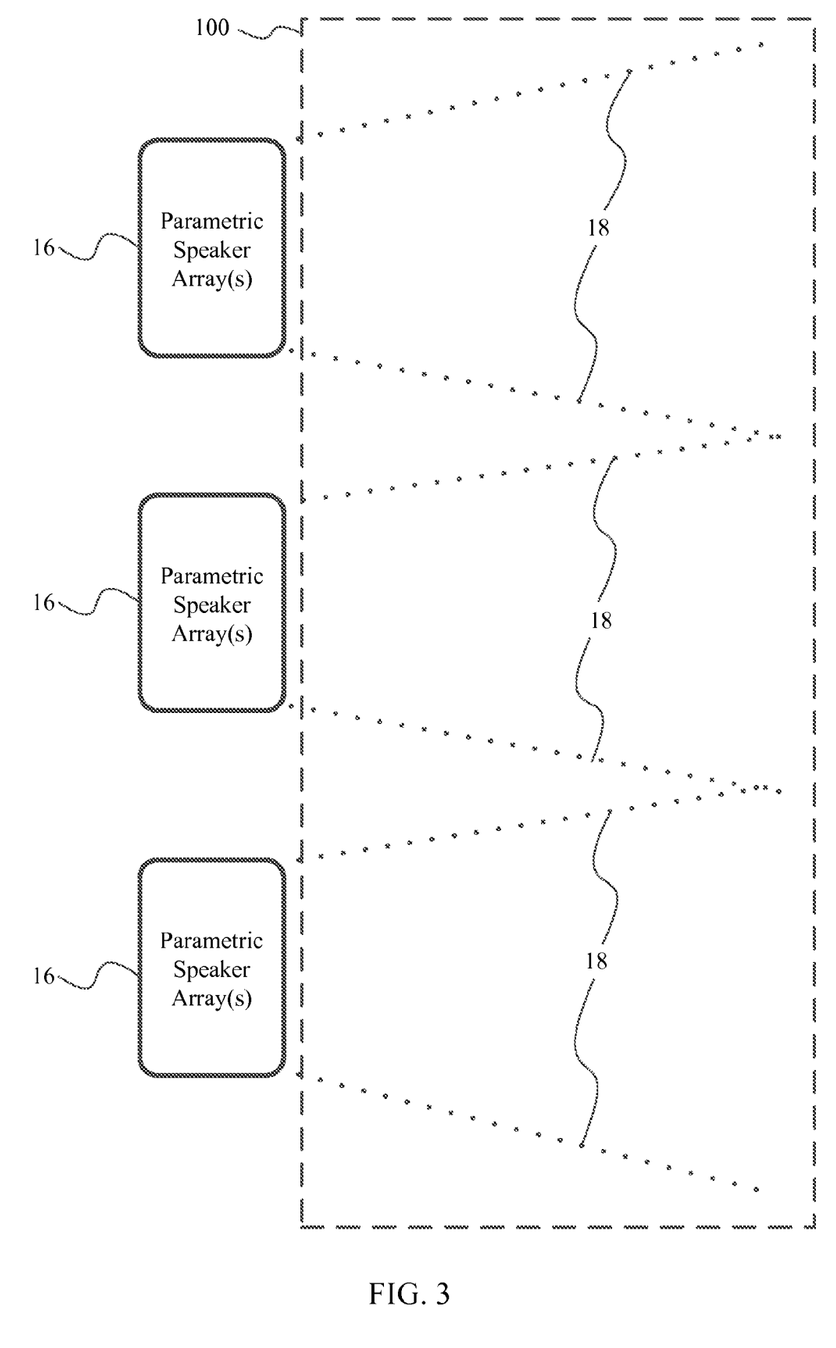
FIG. 3 is an arrangement of parametric speaker arrays aligned along a perimeter region of a define locale in accordance with an embodiment of the present invention.

The present invention can be implemented in a variety of ways depending on the type, size, and/or shape of the defined locale into which sound is to be introduced. For example, parametric speaker arrays can be used in a variety of arrangements/placements to satisfy the needs of many applications. Several non-limiting examples of such arrangement/placements will be described with the aid of FIGS. 3-7. For clarity of illustration, the electronics used to excite the parametric speaker arrays have been omitted. FIG. 3 illustrates a number of parametric speaker arrays 16 aligned in a linear fashion along a perimeter region of defined locale 100 such that a plurality of beams 18 are introduced into defined locale 100 for propagation through defined locale 100. Defined locale 100 could be on the ground or extend vertically into air or other medium.

Figure 4:
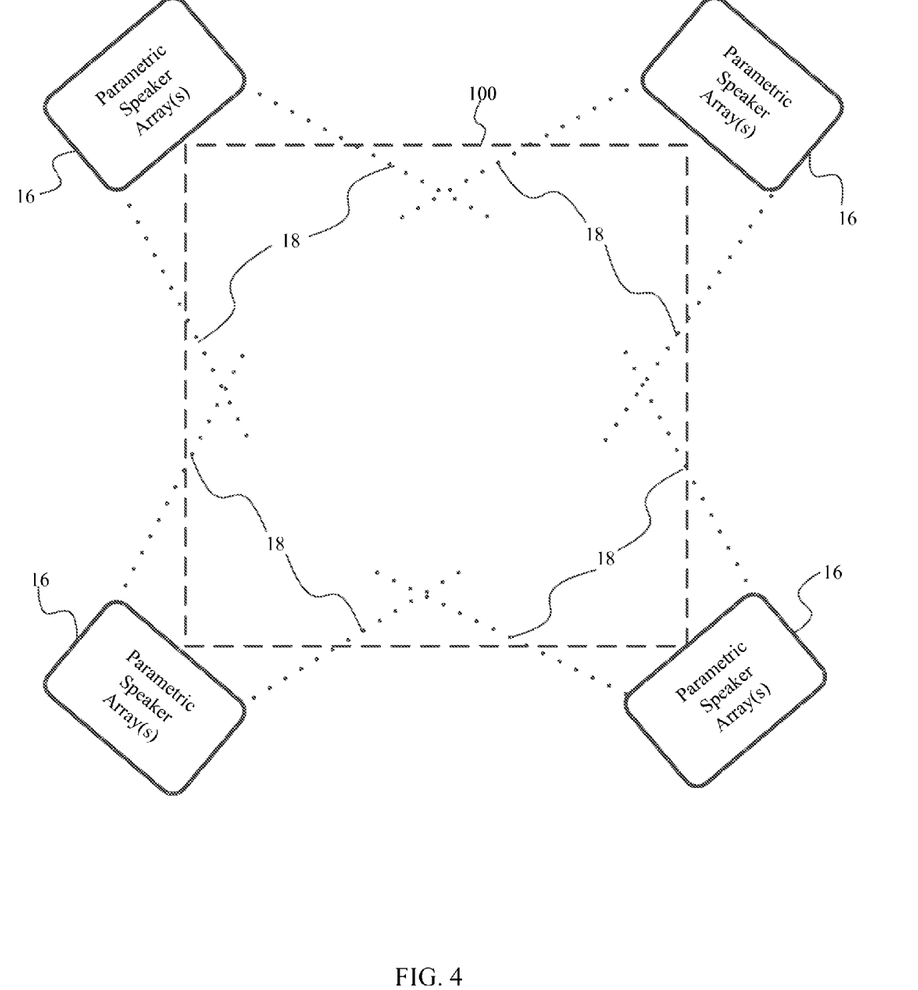
FIG. 4 is an arrangement of parametric speaker arrays distributed about a defined locale in accordance with another embodiment of the present invention.
Figure 5:
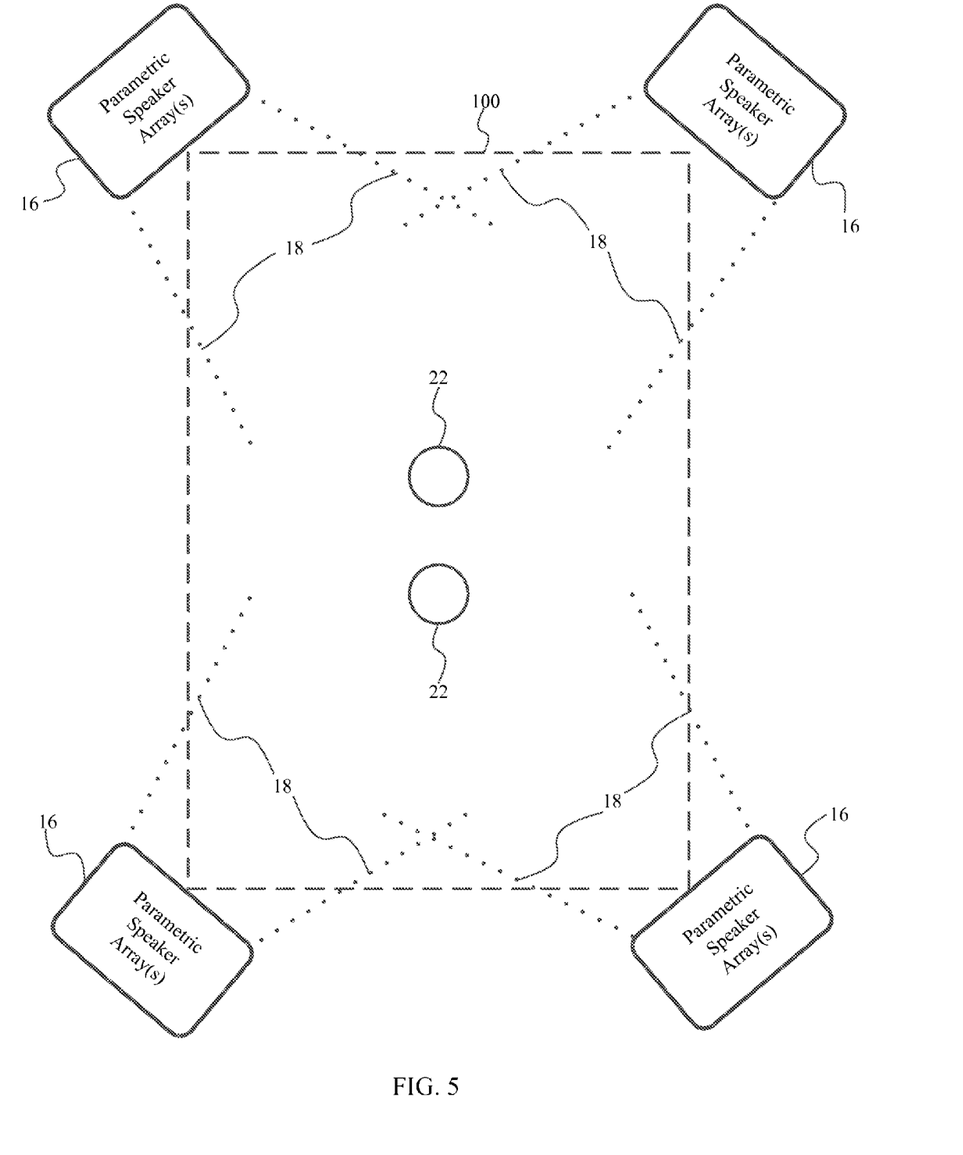
FIG. 5 is an arrangement of parametric speaker arrays and conventional speakers in accordance with another embodiment of the present invention.

FIG. 4 illustrates another embodiment of the present invention where parametric speaker arrays ("PSA") 16 are positioned at, for example, vertices of defined locale 100. Note that parametric speaker arrays 16 can be configured to produce fan or conically-shaped beams 18 in order to distribute the beams' sound throughout defined locale 100. In still another embodiment of the present invention, FIG. 5 illustrates perimeter-located parametric speaker arrays 16 and conventional speakers 22 (e.g., nondirectional speakers) in interior regions of defined locale 100. Speakers 22 would be excited to produce sound having the same attributes of waveform 20 described above. Speakers 22 could be positioned in "dead zones" within defined locale 100 that do not receive the acoustic energy associated with one of beams 18.

Figure 6:
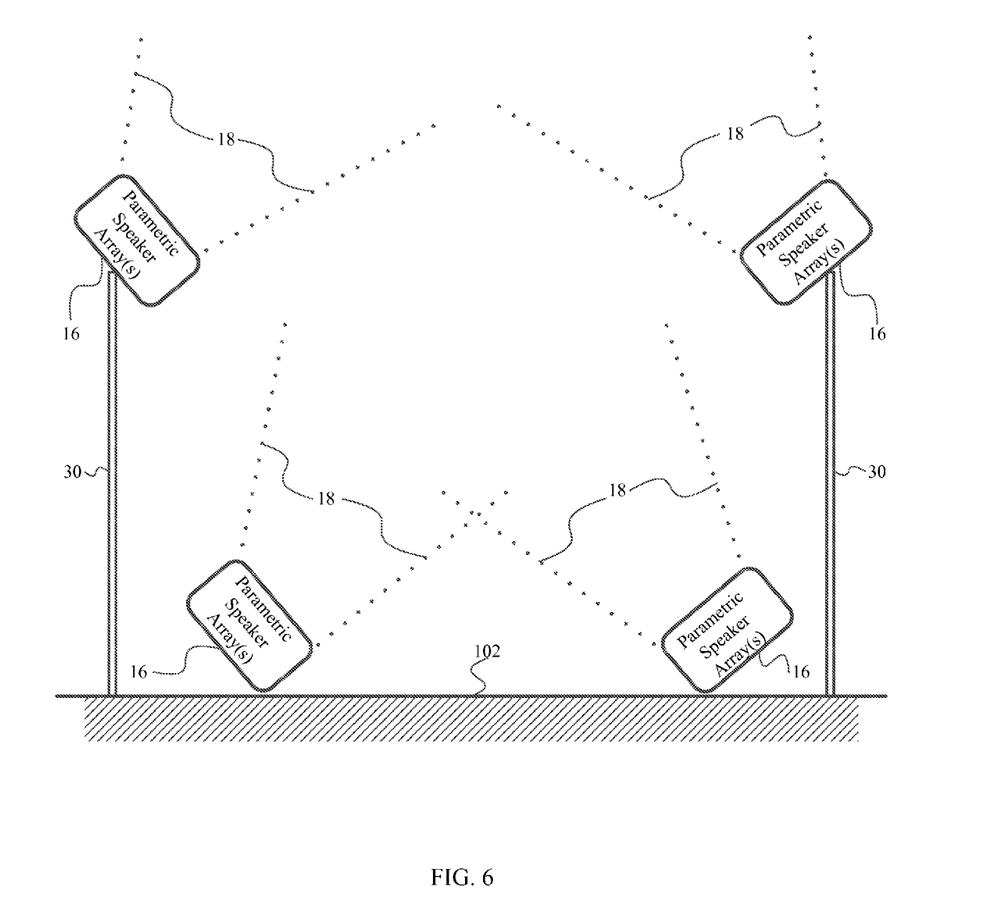
FIG. 6 is an arrangement of parametric speaker arrays at ground and elevated locations in accordance with another embodiment of the present invention.
Figure 7:
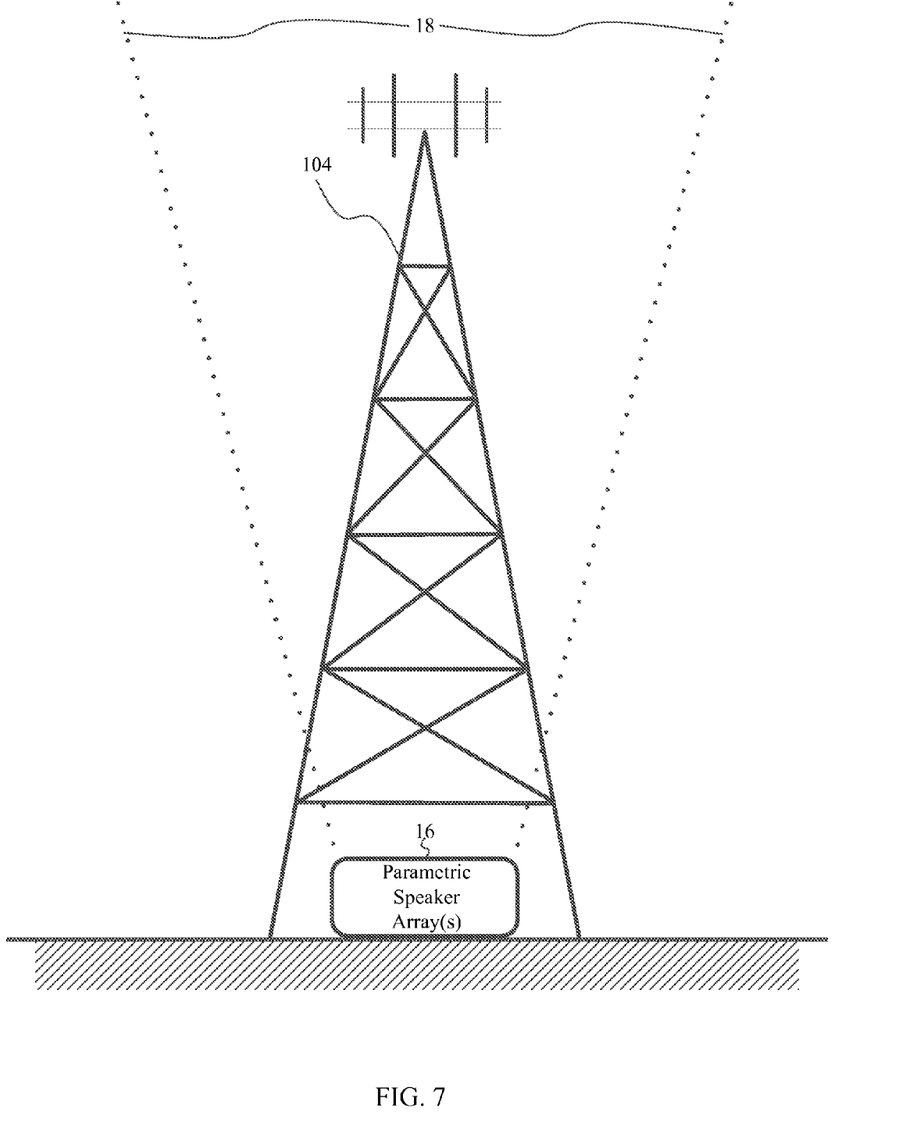
FIG. 7 is an arrangement of parametric speaker arrays positioned to project vertically in accordance with another embodiment of the present invention.

FIG. 6 illustrates an embodiment of the present invention that places parametric speaker arrays 16 at ground locations (e.g., alongside a runway 102) and at elevated locations (e.g., on top of support poles 30). In this way, sound beams 18 cooperate to define a takeoff/landing "tube" substantially cleared of animals (e.g., birds). In FIG. 7, parametric speaker arrays 16 are positioned at the base of a cell tower 104 such that sound beam 18 envelopes tower 104 and its surrounding zone to provide two benefits. First, animals such as birds will not tend to stay or roost on tower 104. Second, as birds fly towards tower 104, they will hear the sound in beam 18 and tend to look up thereby allowing them to see/avoid tower 104. This same idea can be used to construct a sound "zone" around a building or wind turbine in an effort to reduce the numbers of bird-to-building or bird-to-turbine collisions.

Figure 8:
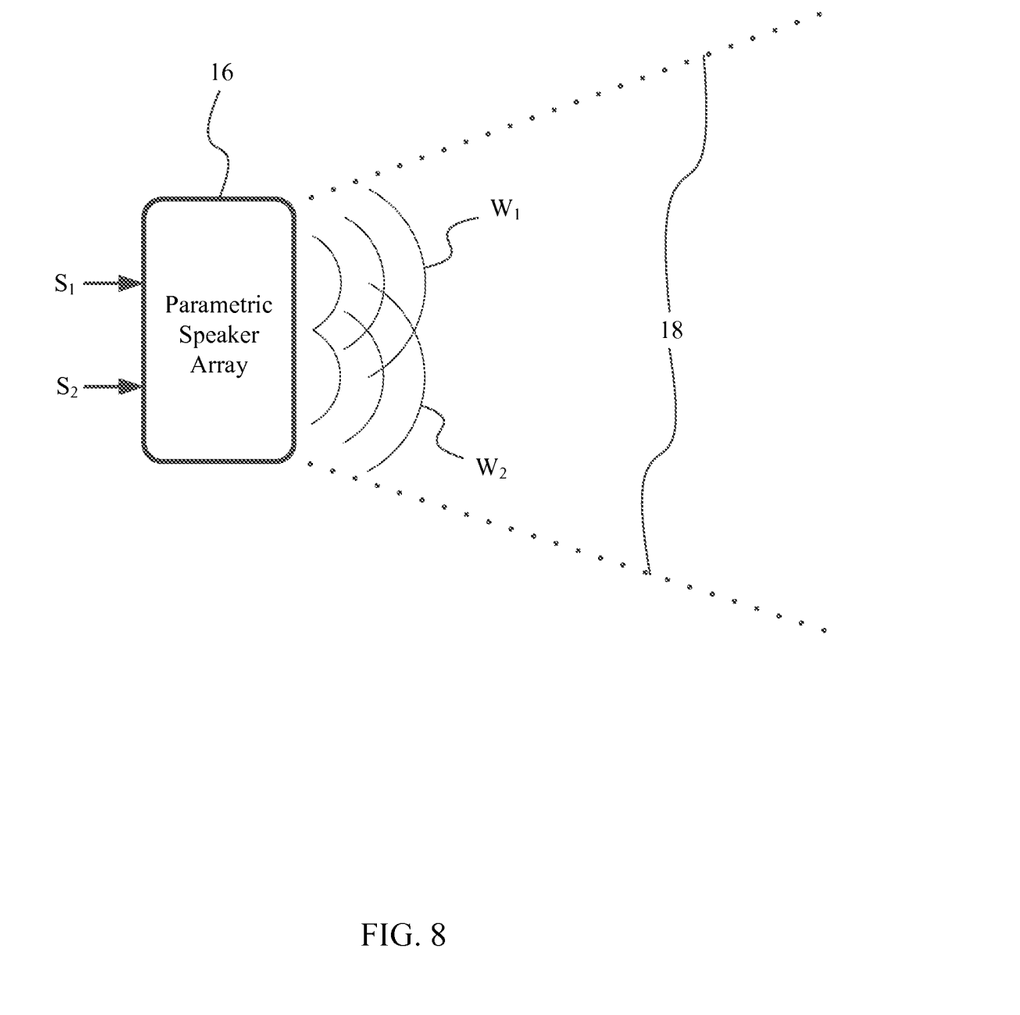
FIG. 8 is a schematic view of a parametric speaker array being excited by signals to produce multiple waveforms at frequencies that are inaudible to humans in accordance with another embodiment of the present invention.
Figure 9:
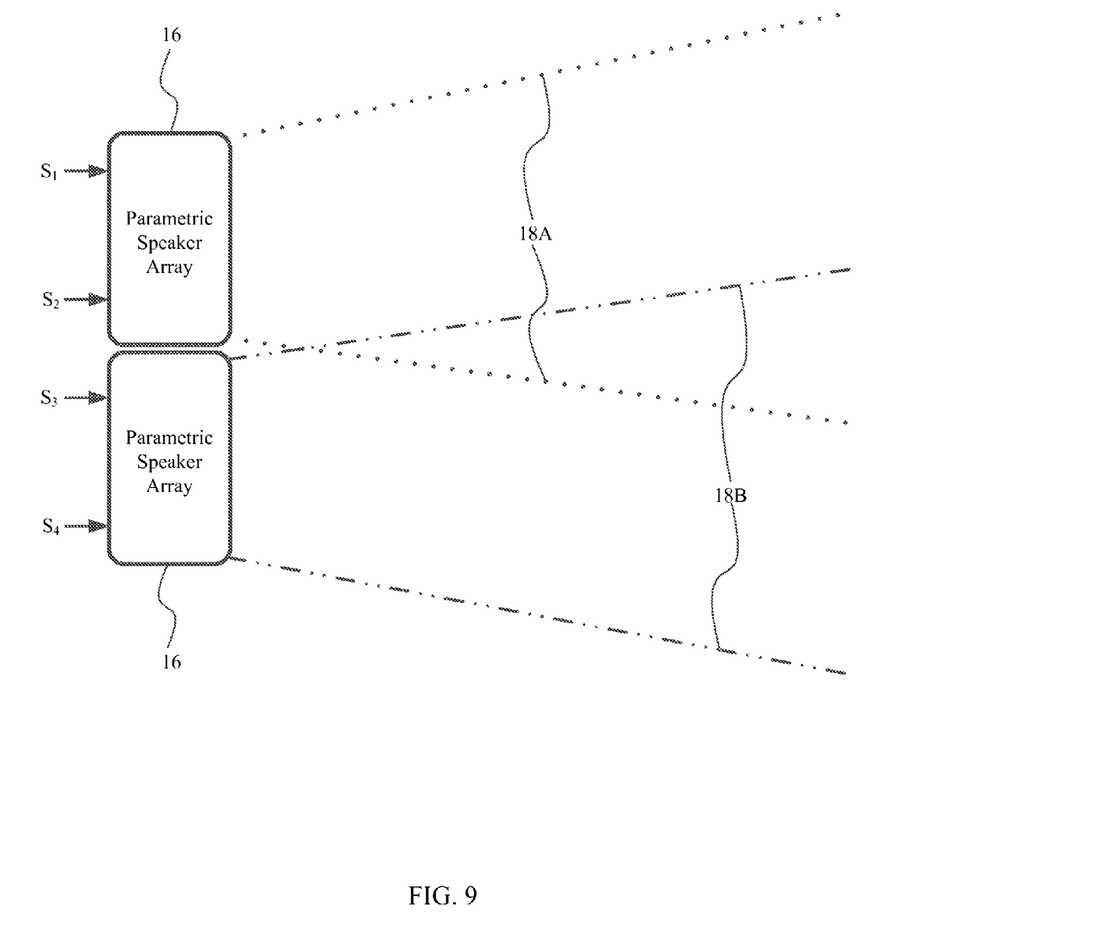
FIG. 9 is a schematic view of parametric speaker arrays being excited by signals to produce pairs of waveforms that combine to control the extent of sound propagation in accordance with another embodiment of the present invention.

As mentioned above, parametric speaker arrays can be a single device excited with signals $S_1$ and $S_2$ to produce two (inaudible) ultrasonic frequency waves $W_1$ and $W_2$, respectively, that combine to create/produce the lower-frequency sound beam 18 as shown in FIG. 8. However, multiple devices could also be used where one device was excited with signal $S_1$ and the other excited by signal $S_2$. The parametric speaker arrays could also be excited by multiple pairs of signals as shown in FIG. 9 to control the range extent of sound propagation. Briefly, signal pair $S_1$ and $S_2$ excite one parametric speaker array 16 to produced sound beam 18A, while signal pair $S_3$ and $S_4$ excite another parametric speaker array 16 to produce sound beam 18B. Each of beams 18A and 18B possesses the attributes of the above-described waveform 20 to thereby provide auditory communication disruption. In addition, beams 18A and 18B are constructed to cancel each other out after some amount of propagation. In this way, the present invention can be designed to limit the propagation range of the auditory-communication-disrupting sound thereby further minimizing or eliminating the sound impact on communities surrounding a defined locale.

Figure 10:
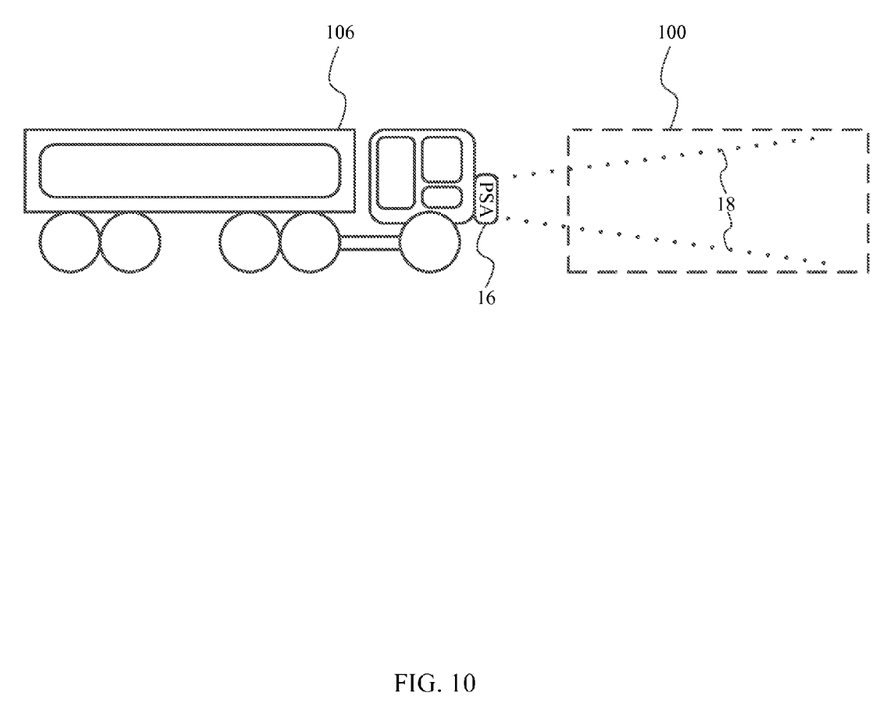
FIG. 10 is a schematic view of a vehicle equipped with a parametric speaker array in accordance with another embodiment of the present invention.

The above-described examples of the present invention utilize stationary sound producers. However, the present invention is not so limited as mobile platforms could also be used without departing from the scope of the present invention. For example, FIG. 10 illustrates a vehicle 106 (e.g., a truck as shown, a watercraft, an aircraft, etc.) with a parametric speaker array 16 mounted thereon for introducing sound beam 18 into a defined locale 100 located ahead of vehicle 106 in order to reduce the presence of animal species in advance thereof. That is, defined locale 100 moves with vehicle 106.

Figure 11:
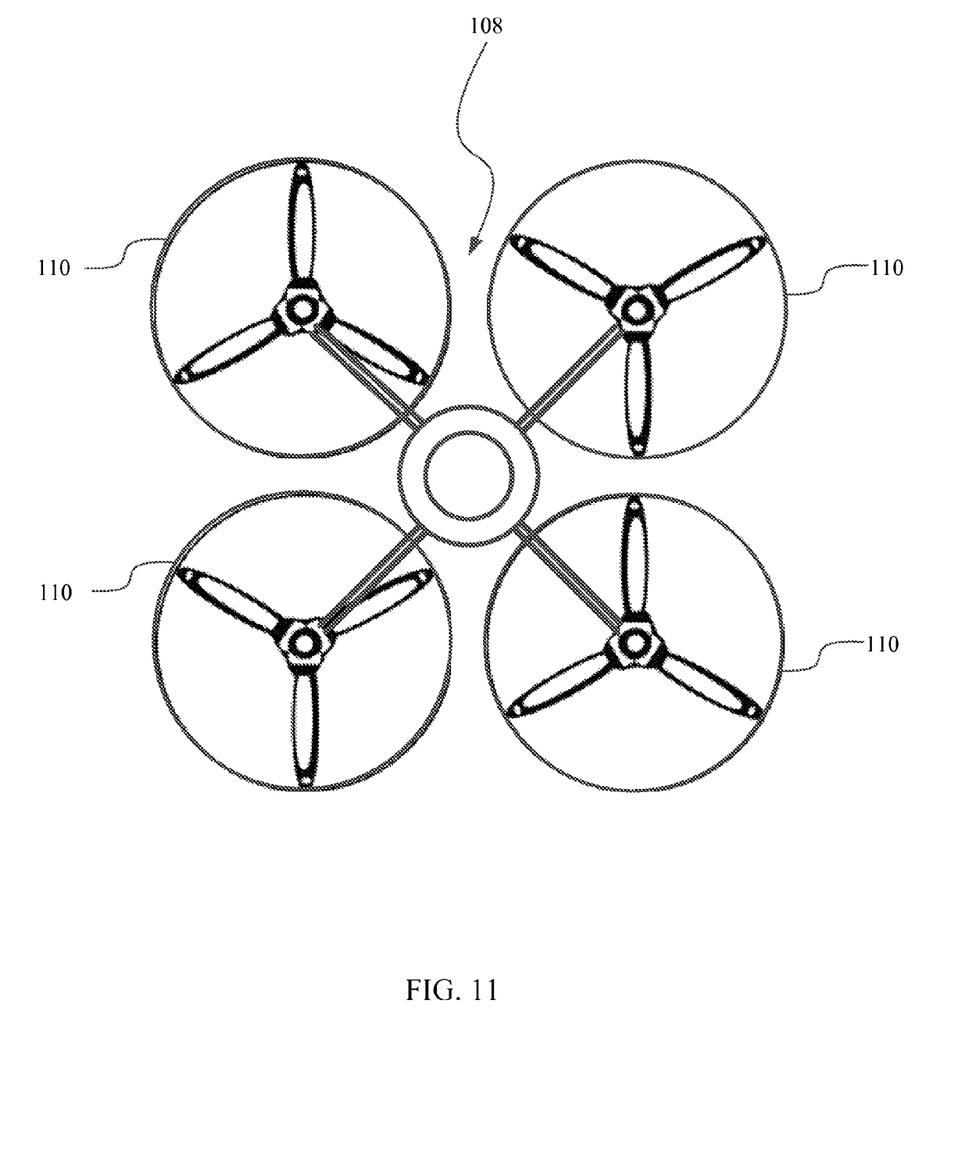
FIG. 11 is a perspective view of a vehicle that, when moving, defines a sound producing device in accordance with another embodiment of the present invention.

In still another embodiment of the present invention, a vehicle can be designed to have a noise signature having the attributes of the above-described waveform 20. The required noise signature could be the result of the vehicle's inherent design or could be developed using stationary or moving elements coupled to the vehicle. For example, FIG. 11 illustrates a vehicle 108 (e.g., a quad copter drone as shown, land vehicle, watercraft, etc.) having appendages 110 coupled thereto that cause sound to be generated as vehicle 108 moves. Appendages 110 could be designed to provide or add to the moving vehicle's noise signature in order to achieve sound having the attributes of waveform 20. Accordingly, it is to be understood that the specific number, size, and/or shape of the appendages are not limitations of the present invention. Such appendages could be fixed, movable, rigid, flexible, etc., without departing from the scope of the present invention.

As mentioned above, the present invention can be adapted for simultaneously disrupting auditory communications between one or more species of animals. Some general frequency ranges for species-specific auditory communications are as follows:

most species of birds communicate in a range from approximately 500 Hz to approximately 20,000 Hz;

most species of bats communicate in a range from approximately 2000 Hz to approximately 110,000 Hz;

most species of land mammals communicate in a range from approximately 15 Hz to approximately 80,000 Hz;

most species of insects communicate in a range from approximately 15 Hz to approximately 210,000 Hz;

most species of fish communicate in a range from approximately 20 Hz to approximately 1000 Hz;

most species of seals and sea lions communicate in a range from approximately 450 Hz to 75,000 Hz; and most species of dolphins, porpoises and whales communicate in a range from approximately 7 Hz to approximately 180,000 Hz.

If only a specific one of the above species is to be targeted, the sound produced by the present invention can be restricted to the relevant portion of the above frequency ranges.

The advantages of the present invention are numerous. Animal species' auditory communications are disrupted with low sound level noise as the means to substantially reduce or eliminate the presence of targeted animals in a defined locale. Judicious placement and operation of parametric speaker arrays allow the introduced noise to be confined to a defined locale thereby minimizing/eliminating any noise impact on surrounding communities. The approach is not harmful to any species and, therefore, is a benign approach to control of animals in defined locales.

Although the invention has been described relative to a specific embodiment thereof, there are numerous variations and modifications that will be readily apparent to those skilled in the art in light of the above teachings. For example, the sound producing source(s) could be operated to produce the above-described disrupting sound continuously, periodically, on demand, in response to signals provided by detection sensors, etc., without departing from the scope of the present invention. Further, sound producing sources in accordance with the present invention could include nondirectional speakers placed on or near a structure that needs to remain free of one or more species for proper operation. Such structures could include solar panels, wind turbine blades, etc. It is therefore to be understood that, within the scope of the appended claims, the invention may be practiced other than as specifically described.

What is claimed as new and desired to be secured by Letters Patent of the United States is:

1. A method of disrupting auditory communications among animals in a defined locale, comprising the step of introducing sound into a defined locale, said sound defined by
   (i) a frequency range commensurate with a communication frequency range used by an animal species to carry out auditory communications by members of said animal species, said auditory communications comprising sounds generated by said members of said animal species wherein said sounds generated by said members of said animal species have a frequency-modulated waveform,
   (ii) colored noise in said frequency range, and
   (iii) a sound level at a perimeter region of the defined locale not to exceed approximately a peak sound level associated with said frequency-modulated waveform,
   wherein said sound overlays said sounds generated by said members of said animal species wherein details of said frequency-modulated waveform are made unintelligible to said animal species to thereby make said sounds generated by said animal species unintelligible to said members of said animal species in the defined locale.

2. A method according to claim 1, wherein said step of introducing includes the steps of:
   positioning at least one parametric speaker array at a perimeter location of the defined locale; and
   exciting said at least one parametric speaker array to produce said sound.

3. A method according to claim 2, wherein said at least one parametric speaker array comprises a plurality of parametric speaker arrays, said method further comprising the step of positioning said parametric speaker arrays about the defined locale wherein said sound introduced into the defined locale is distributed throughout the defined locale.

4. A method according to claim 3, wherein said step of exciting produces waveforms at said parametric speaker arrays at multiple and distinct frequencies that are inaudible to humans, and wherein said waveforms interact to produce said sound.

5. A method according to claim 1, wherein said step of introducing said sound is accomplished from at least one stationary location.

6. A method according to claim 1, wherein said step of introducing said sound is accomplished from at least one moving platform.

7. A method according to claim 1, wherein said sound is produced by at least one of a directional source and a nondirectional source.

8. A method according to claim 1, wherein said frequency range comprises at least a portion of a range extending from approximately 7 Hz to approximately 210,000 Hz.

9. A method according to claim 8, wherein said portion is selected from the group consisting of approximately 500 Hz to approximately 20,000 Hz, approximately 2000 Hz to approximately 110,000 Hz, approximately 15 Hz to approximately 80,000 Hz, approximately 15 Hz to approximately 210,000 Hz, approximately 20 Hz to approximately 1000 Hz, approximately 450 Hz to approximately 75,000 Hz, and approximately 7 Hz to approximately 180,000 Hz.

10. A system for disrupting auditory communications among animals in a defined locale, comprising at least one sound producing device for introducing produced sound into a defined locale, said produced sound defined by
    (i) a frequency range commensurate with a communication frequency range used by an animal species to carry out auditory communications by members of said animal species, said auditory communications comprising sounds generated by said members of said animal species wherein said sounds generated by said members of said animal species have a frequency-modulated waveform,
    (ii) colored noise in said frequency range, and
    (iii) a sound level at a perimeter region of the defined locale not to exceed approximately a peak sound level associated with said frequency-modulated waveform,
    wherein said produced sound overlays said sounds generated by said members of said animal species wherein details of said frequency-modulated waveform are made unintelligible to said animal species to thereby make said sounds generated by said animal species unintelligible to said members of said animal species in the defined locale.

11. A system as in claim 10, wherein said at least one sound producing device comprises at least one parametric speaker array.

12. A system as in claim 11, wherein said at least one parametric speaker array comprises a plurality of parametric speaker arrays positioned about the defined locale wherein said sound introduced into the defined locale is distributed throughout the defined locale.

13. A system as in claim 12, wherein said parametric speaker arrays produce waveforms at multiple and distinct frequencies that are inaudible to humans, and wherein said waveforms interact to produce said sound.

14. A system as in claim 10, wherein said step at least one sound producing device is stationary.

15. A system as in claim 10, wherein said at least one sound producing device is mounted on a vehicle.

16. A system as in claim 10, wherein said at least one sound producing device comprises a vehicle.

17. A system as in claim 10, wherein said frequency range comprises at least a portion of a range extending from approximately 7 Hz to approximately 210,000 Hz.

18. A system as in claim 17, wherein said portion is selected from the group consisting of approximately 500 Hz to approximately 20,000 Hz, approximately 2000 Hz to approximately 110,000 Hz, approximately 15 Hz to approximately 80,000 Hz, approximately 15 Hz to approximately 210,000 Hz, approximately 20 Hz to approximately 1000 Hz, approximately 450 Hz to approximately 75,000 Hz, and approximately 7 Hz to approximately 180,000 Hz.

\* \* \* \* \*